(12) United States Patent
Su

(10) Patent No.: US 7,699,569 B2
(45) Date of Patent: Apr. 20, 2010

(54) SELF-DRILLING SCREW

(75) Inventor: Guo-Cai Su, Kaohsiung (TW)

(73) Assignee: Taiwan Shan Yin Int'l Co., Ltd., Kaohsiung (TW)

( * ) Notice: Subject to any disclaimer, the term of this patent is extended or adjusted under 35 U.S.C. 154(b) by 389 days.

(21) Appl. No.: 11/653,844

(22) Filed: Jan. 17, 2007

(65) Prior Publication Data

US 2007/0116540 A1   May 24, 2007

Related U.S. Application Data

(63) Continuation-in-part of application No. 11/296,213, filed on Dec. 8, 2005, now abandoned.

(51) Int. Cl.
*F16B 25/02* (2006.01)

(52) U.S. Cl. .................................. 411/387.1

(58) Field of Classification Search ...... 411/368–387.8, 411/416
See application file for complete search history.

(56) References Cited

U.S. PATENT DOCUMENTS

| | | | | | |
|---|---|---|---|---|---|
| 684,774 | A | * | 10/1901 | Baggs | .................... 411/386 |
| 2,388,482 | A | * | 11/1945 | Haynes | .................... 411/387.4 |
| 3,094,894 | A | * | 6/1963 | Broberg | .................... 411/387.4 |
| 3,665,801 | A | * | 5/1972 | Gutshall | .................... 411/387.7 |
| 4,028,987 | A | * | 6/1977 | Wilson | .................... 411/387.2 |
| 4,034,641 | A | * | 7/1977 | Williams et al. | .......... 411/387.7 |
| 4,147,088 | A | * | 4/1979 | Whittaker, Jr. | ............ 411/387.8 |
| 4,257,307 | A | * | 3/1981 | Regensburger | ........... 411/387.1 |
| D260,525 | S | * | 9/1981 | Lassiter | ..................... D15/139 |
| 4,369,609 | A | * | 1/1983 | Sheldon et al. | ................ 52/478 |
| 4,386,882 | A | * | 6/1983 | Bereiter | .................... 411/387.1 |
| 4,753,562 | A | * | 6/1988 | Hirayoshi | ................. 411/387.6 |
| 4,874,278 | A | * | 10/1989 | Kawashita | .................... 411/386 |
| 6,698,987 | B1 | * | 3/2004 | Dicke | ....................... 411/387.6 |
| 6,887,023 | B1 | * | 5/2005 | Lu et al. | .................... 411/387.1 |
| 7,090,452 | B2 | * | 8/2006 | Chen | ........................ 411/387.1 |
| 2008/0080951 | A1 | * | 4/2008 | Lin | ........................... 411/387.6 |

* cited by examiner

*Primary Examiner*—Flemming Saether
(74) *Attorney, Agent, or Firm*—Rosenberg, Klein & Lee

(57) ABSTRACT

A self-drilling screw is in particular to a drill portion having a non-threaded first drilling section connecting with the shank and a second drilling section connecting with said first drilling section and forms two grooves therein. Moreover, the whole first drilling section is formed as an oval-shaped pillar and it has two ridges extending therefrom. Furthermore, the diameter of the first drilling section is smaller than the diameter of the second drilling section, and the length of the second drilling section is between the length of one-third drill portion and the length of two-thirds drill portion. Therefore, due to the aforesaid features and the two drilling sections, the molds for manufacturing the screws suffer less damage while in operation and the manufacturing cost is therefore reduced. The present invention is also good at increasing the screwing speed. Moreover, the surface of the first drilling section also has the function of allowing the user to engrave a mark thereon.

2 Claims, 5 Drawing Sheets

SELF-DRILLING SCREW

REFERENCE TO RELATED APPLICATION

This Application is a Continuation-in-Part of patent application Ser. No. 11/296,213, filed 8 Dec. 2005, now abandoned.

BACKGROUND OF THE INVENTION

1. Field of the Invention

The present invention relates to a self-drilling screw. In particular, it relates to a self-drilling screw with the function of reducing the manufacturing cost, increasing the screwing speed and allowing the user to engrave a mark on it.

2. Description of the Related Art

Generally, the length of the drilling portion of a self-drilling screw is designed according to the thickness of the object that the self-drilling screw is going to penetrate. An example of long drilling portion of self-drilling screw is described below.

Referring to FIG. 1, a conventional self-drilling screw 1 disclosed in U.S. Pat. No. 7,090,452 B2 comprises a head 11, a shank 12 extending from the head 11 and having a plurality of threads 121, a cutting member 13 extending from the shank 12, and an annular groove 14 provided between the shank 12 and the cutting member 13. Moreover, the cutting member 13 has a plurality of lengthwise cutting grooves 131 and a plurality of lengthwise wings 132 projecting therefrom. The annular groove 14 provides a volume to contain the debris from the cut object. While in operation, the conventional self-drilling screw 1 penetrates into an object with the cutting member 13 cutting said object. Meanwhile, the debris from said object temporarily accumulates in the annular groove 14.

However, the conventional self-drilling screw has several defects:

1. Due to the cutting member is long, the mold for making the cutting member of the self-drilling screw will be easily destroyed. The longer the cutting member is, the more serious damage the mold suffers. The life of the mold therefore shortens, and the manufacturing cost therefore increases.
2. Although the annular groove can help to contain the debris, it is not really benefit at obviating the debris. Since the debris is not easily obviated, it will be accumulated in the room between the screw and the object. Therefore, while in operation, the user suffers more resistance from the object. Therefore, while in operation, it wastes the user much labor to screw said self-drilling screw.

The present invention intends to provide an improved self-drilling screw which can efficiently drill into the object with less resistance and reduce the damage to the mold when shaping its cutting member.

SUMMARY OF THE INVENTION

The present invention relates to a self-drilling screw with the function of reducing the manufacturing cost, increasing the screwing speed and allowing the user to engrave a mark on it.

The self-drilling screw in accordance with the present invention comprises a head and a shank connecting to the head; wherein, the shank has a plurality of threads spirally disposed thereon and a drill portion formed in its distal end, and the drill portion forms a cone-shaped surface in its tip and two grooves therein. Moreover, said drill portion is in particular to its having a non-threaded first drilling section connecting with the shank and a second drilling section connecting with the first drilling section. Besides, the two ends of each aforesaid groove respectively connect to the first drilling section and the cone-shaped surface, and each groove forms a cutting edge on its boundary. Therefore, due to the aforesaid features and the two drilling sections, the molds for manufacturing the screws suffer less damage while in operation and the manufacturing cost is therefore reduced. Furthermore, the whole first drilling section is formed as an oval-shaped pillar and it has two ridges extending therefrom, and said ridges are helpful to the higher debris-obviating speed. The screwing speed therefore increases. Still further, the surface of the first drilling section also has the function of allowing the user to engrave a mark thereon.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
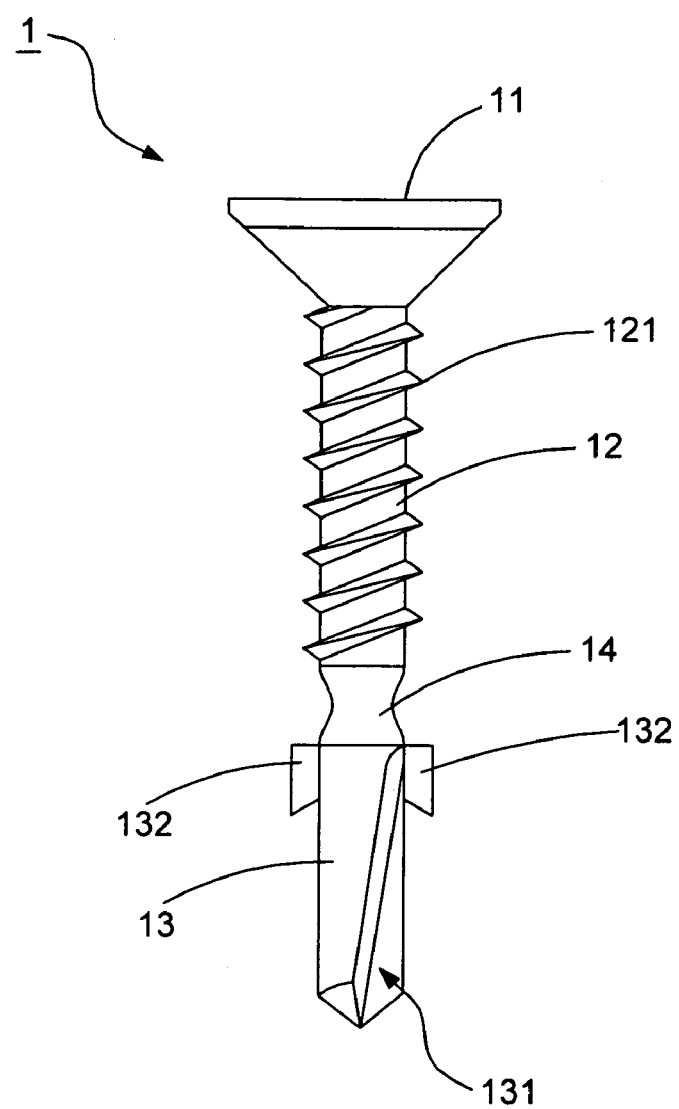
FIG. 1 is a perspective view to show the conventional self-drilling screw.
Figure 2:
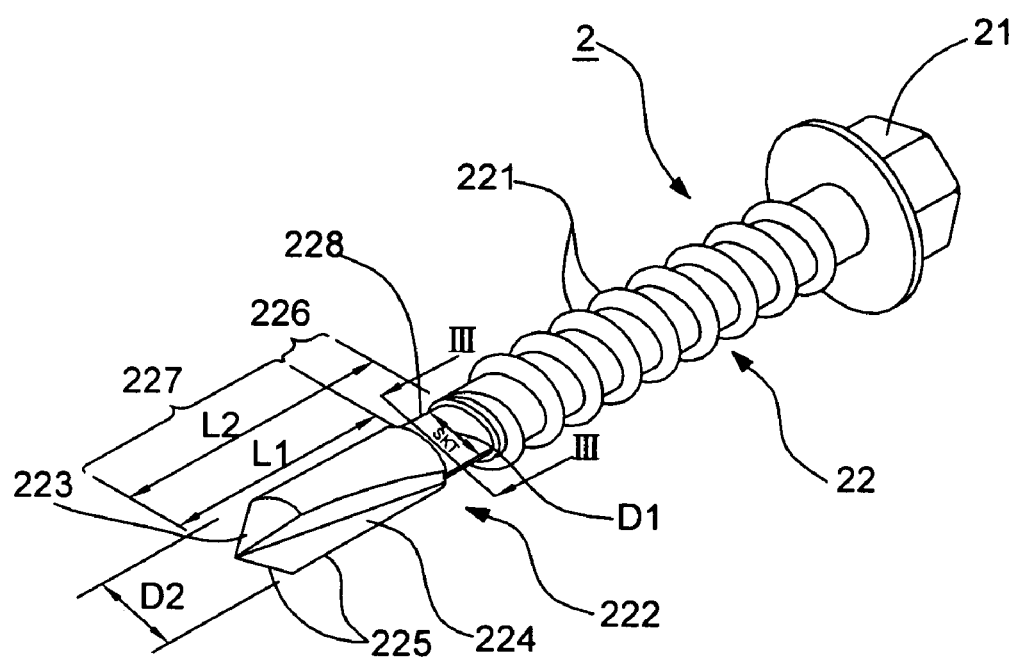
FIG. 2 is a perspective view to show a preferred embodiment of the present invention.

Referring to FIG. 2, the self-drilling screw 2 of the present invention comprises a head 21 and a shank 22 connecting to the head 21, wherein, the shank 22 has a plurality of threads 221 spirally disposed thereon and a drill portion 222 formed in its distal end.

To be more specific, the drill portion 222 has a non-threaded first drilling section 226 connecting with the shank 22 and a second drilling section 227 connecting with the first drilling section 226; wherein, the length L1 of the second drilling section 227 is between the length L2 of one-third drill portion 222 and the length L2 of two-thirds drill portion 222. Moreover, two grooves 224 (here only one groove is shown in the figure) are defined in the second drilling section 227, and each groove 224 forms a cutting edge 225 on its boundary with the second drilling section 227. Furthermore, a cone-shaped surface 223 is formed on the second drilling section 227. Besides, due to the first drilling section 226 being non-threaded, it has more room to contain the debris and its surface can allow the user to engrave a trademark thereon, and the size of said trademark will be bigger than the size of the trademark which is engraved on the head. Therefore, the consumers can easily distinguish the self-drilling screw 2 form other screws. It is quite effective in advertising.

Figure 3:
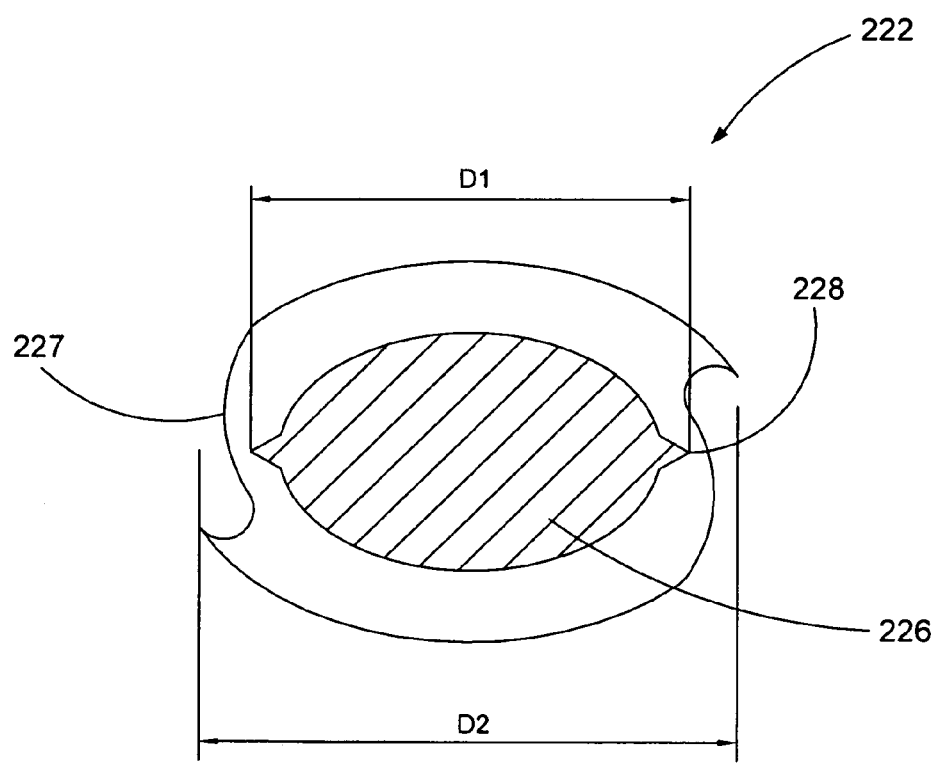
FIG. 3 shows the downward view of the cross section cutting from the III-III line.

Furthering to refer to FIG. 2 and FIG. 3, due to the first drilling section 226 and the second drilling section 227 being made by the way of stamping, the whole first drilling section 226 is formed as an oval-shaped pillar, and its diameter D1 is smaller than the diameter D2 of the second drilling section 227 and the outer diameter of the shank 22. Moreover, the first drilling section 226 also has two ridges 228 extending therefrom. The aforesaid two ridges 228 is disposed correspondingly in order to have the function of pushing the debris while in operation, and therefore the debris will much easily be obviated and the debris-obviating speed will increase.

Figure 4:
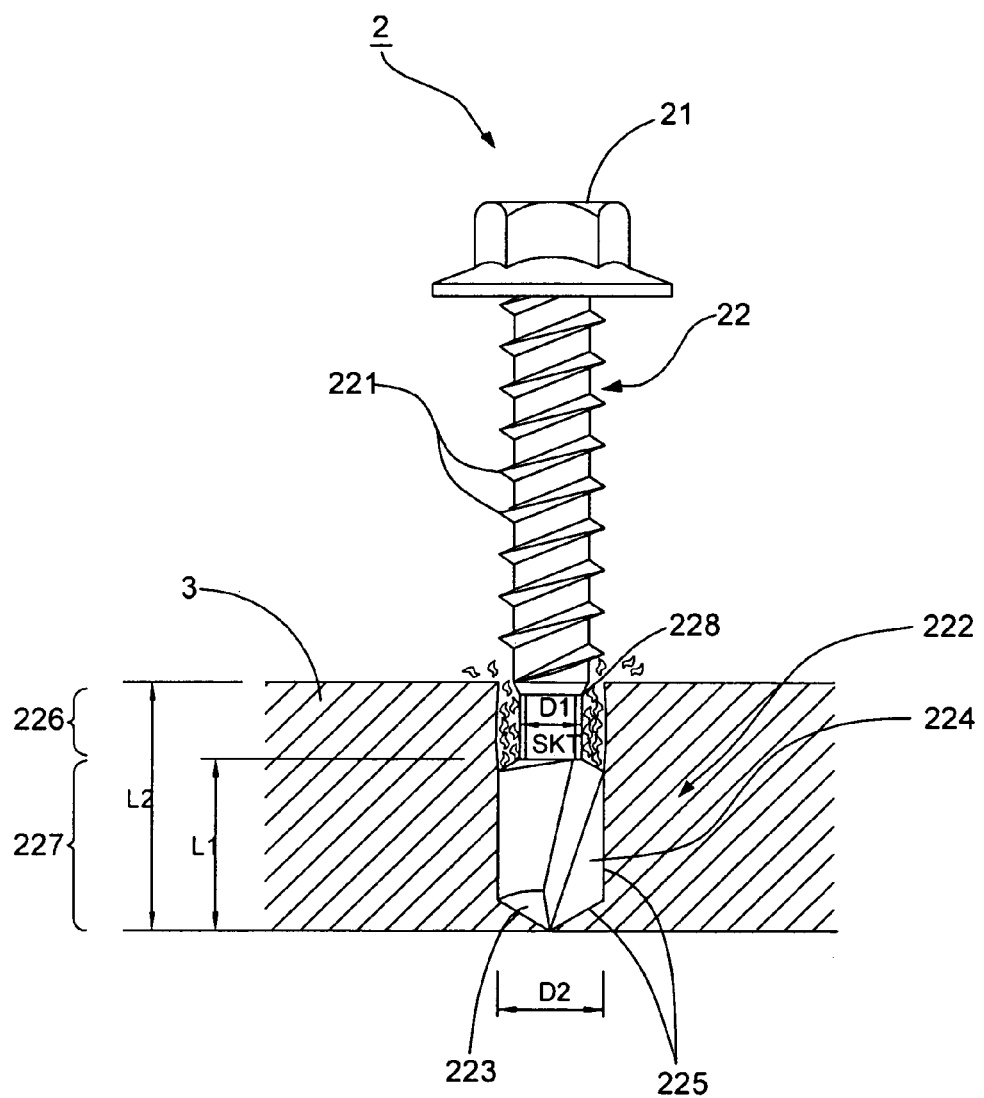
FIG. 4 shows the preferring embodiment of the present invention screwing into an object.

Referring to FIG. 4, while in operation, the self-drilling screw 2 screws into an object 3 with its drill portion 222 cutting the object 3, and the whole drill portion 222 is totally sank into the object 3. Due to the first drilling section 226 having more room to contain the debris, the debris can be rapidly accumulated in the room of the first drilling section 226. Moreover, while the second drilling section 227 is screwing, the cutting edge 225 touches less surface of the object 3 and the resistance from the object 3 therefore reduces. However, the screwing ability of the self-drilling screw 2 is not affected by the first drilling section 226. Furthermore, while the room of the first drilling section 226 gradually fills with the debris, the two ridges 228 extending from the first drilling section 226 will start to push the debris upwardly. Therefore, the debris accumulated in the room of the first drilling section 226 will be obviated much rapidly and the screwing speed will enhance relatively.

Figure 5:
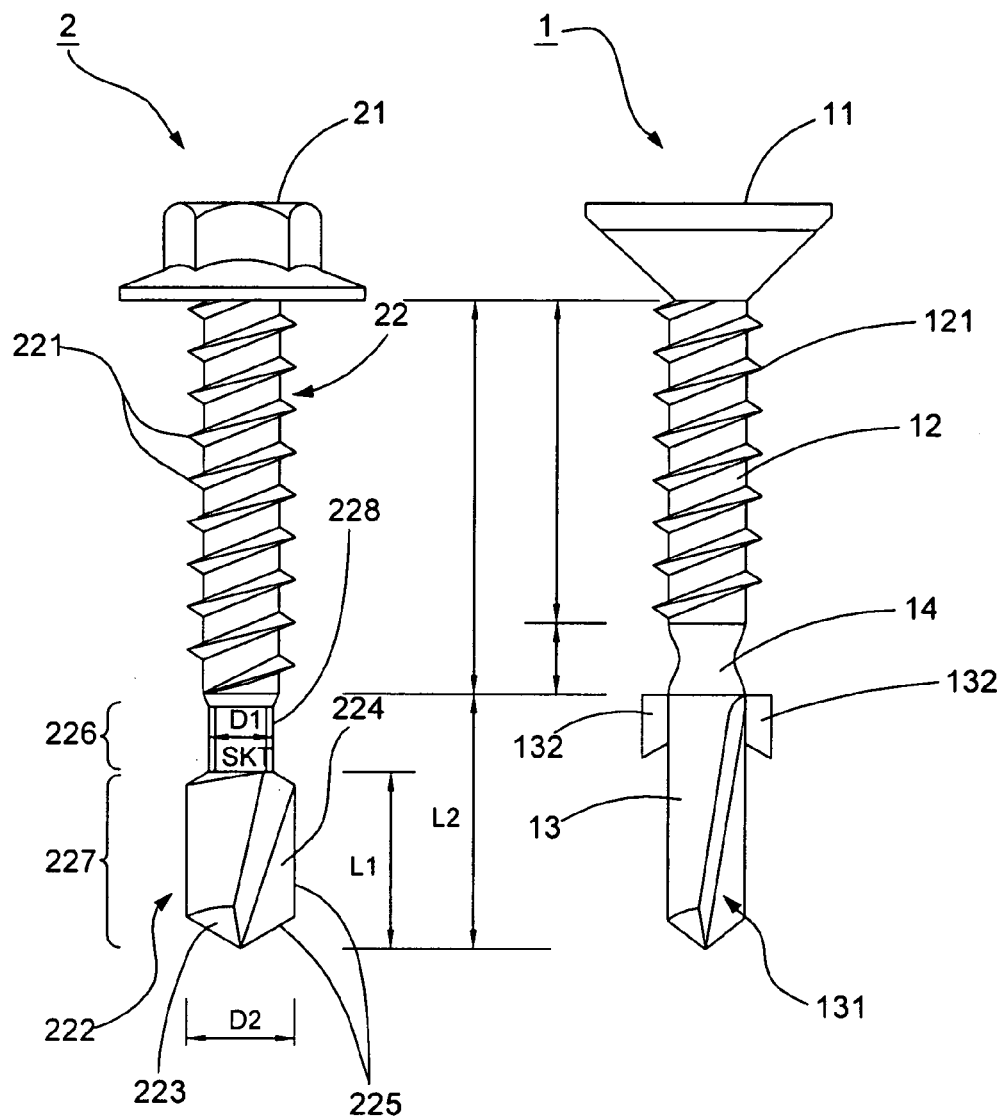
FIG. 5 shows the comparison between the conventional self-drilling screw and the present invention.

Referring to FIG. 5, it is a drawing to compare the conventional self-drilling screw 1 with the present invention 2. Due to that the length of a drill portion (or a cutting member) of a screw is always decided by the depth of the object which said screw is going to screw into, said drill portion (or cutting member) has to be 13 mm if the aforesaid object is 13 mm. Therefore, if the conventional self-drilling screw 1 is used to screw into said object, it needs to have a 13 mm cutting member 13 thereon. Relatively, the cutting edge of the conventional self-drilling screw 1 also has to be 13 mm. Therefore, the mold used to make the cutting member 13 (not shown in the figure) suffers more pressure while in operation and its life will be shortened. However, the drill portion 222 of the self-drilling screw 2 is combined by a first drilling section 226 and a second drilling section 227, and the length of the second drilling section 227 is between the length of one-third drill portion 222 and the length of two-thirds drill portion 222. Therefore, since the length of the drill portion 222 is 13 mm, the second drilling section 227 will probably be 7 mm and the cutting edge 225 will relatively be 7 mm. The mold used to make the drill portion 222 (not shown in the figure) hence suffers less pressure while in operation due to the shorter length. Furthermore, the mold is not easily broken, and the manufacturing fee is reduced relatively.

To sum up, the drill portion of the self-drilling screw is combined by a first drilling section and a second drilling section. Moreover, said first drilling section has the function of containing the debris and being engraved with a trademark, and two ridges extend from said first drilling section. Therefore, while in operation, the debris can be contained and obviated rapidly. Finally, accompanying with the cutting edges and the grooves formed in the second drilling section being shorter than the cutting member of the conventional self-drilling screw, the attrition rate of the mold will decrease and the life of the mold will increase.

While we have shown and described the embodiment in accordance with the present invention, it should be clear to those skilled in the art that further embodiments may be made without departing from the scope of the present invention.

I claim:

1. A self-drilling screw comprising:
   a head and a shank connecting to the head, and the shank having a plurality of threads spirally disposed thereon and a drill portion formed in its distal end;
   the drill portion forming a cone-shaped surface in its tip, and having a non-threaded first drilling section connecting with the shank and a second drilling section connecting with the first drilling section and having two grooves formed therein;
   two ends of each groove respectively connects to the first drilling section and the cone-shaped surface, and each groove forms a cutting edge on its boundary; the first drilling section being formed as an oval-shaped pillar having a predetermined diameter having two ridges extending therefrom defining a pair of guiding projections formed on opposing diametrical surfaces of said first drilling section;
   the diameter of the first drilling section is smaller than a diameter of the second drilling section, and the length of the second drilling section is within the range of the length of one-third drill portion and the length of two-thirds drill portion.

2. The self-drilling screw as claimed in claim 1, wherein the surface of the first drilling section allows the user to engrave a mark thereon.

* * * * *